(12) United States Patent
Komamura

(10) Patent No.: US 9,086,082 B2
(45) Date of Patent: Jul. 21, 2015

(54) CONNECTION DEVICE

(75) Inventor: Takeo Komamura, Matudo (JP)

(73) Assignee: Sofken Company, Ltd., Chiba (JP)

( * ) Notice: Subject to any disclaimer, the term of this patent is extended or adjusted under 35 U.S.C. 154(b) by 865 days.

(21) Appl. No.: 12/597,388

(22) PCT Filed: Jan. 31, 2008

(86) PCT No.: PCT/JP2008/051543
§ 371 (c)(1),
(2), (4) Date: Mar. 25, 2010

(87) PCT Pub. No.: WO2008/139753
PCT Pub. Date: Nov. 20, 2008

(65) Prior Publication Data
US 2010/0329774 A1    Dec. 30, 2010

(30) Foreign Application Priority Data

May 16, 2007   (JP) .................................. 2007-130248

(51) Int. Cl.

| | |
|---|---|
| *F16B 5/06* | (2006.01) |
| *E04B 2/76* | (2006.01) |
| *F16B 2/10* | (2006.01) |
| *F16B 7/04* | (2006.01) |
| *F16B 12/02* | (2006.01) |
| *F16B 12/32* | (2006.01) |

(52) U.S. Cl.
CPC ............... *F16B 5/0607* (2013.01); *E04B 2/766* (2013.01); *F16B 2/10* (2013.01); *F16B 7/04* (2013.01); *F16B 12/02* (2013.01); *F16B 12/32* (2013.01); *Y10T 403/24* (2015.01)

(58) Field of Classification Search
CPC .............. F16B 2/10; F16B 2/18; F16B 2/185; F16B 5/0607; F16B 5/0642; F16B 5/123
USPC ................. 403/322.4, 240, 247, 252, 256, 33
See application file for complete search history.

(56) References Cited

U.S. PATENT DOCUMENTS

| | | | | |
|---|---|---|---|---|
| 2,614,781 A | * | 10/1952 | Engel | ............................ 248/502 |
| 3,600,999 A | * | 8/1971 | Daniels | ............................ 83/686 |
| 4,142,810 A | * | 3/1979 | Lesaint | ........................ 403/252 |
| 5,407,289 A | * | 4/1995 | Pebre | ............................ 403/252 |
| 7,625,033 B2 | * | 12/2009 | Michelau et al. | ............. 296/177 |

(Continued)

FOREIGN PATENT DOCUMENTS

| | | |
|---|---|---|
| JP | 47-14527 | 5/1972 |
| JP | 50-64109 | 6/1975 |

(Continued)

*Primary Examiner* — Daniel P Stodola
*Assistant Examiner* — Jonathan Masinick
(74) *Attorney, Agent, or Firm* — Jordan and Hamburg LLP

(57) ABSTRACT

A connection device for detachably and strongly fixing two connection target members has two confronting lever members configured to swing about a fulcrum member, a screw hole formed in the lever member of the confronting lever members and an insertion hole, through which a screw passes, formed in the other lever member. Both the lever members are caused to approach each other by screwing the screw into the screw hole so that locking portions of the lever members are displaced so as to be moved upward through the fulcrum member constituting a fulcrum portion. A fixing device main body is fixed to one of connection target members by a screw passing through the fulcrum member and the locking portions are locked to the other connection target member.

7 Claims, 8 Drawing Sheets

(56) References Cited

U.S. PATENT DOCUMENTS

| | | | |
|---|---|---|---|
| 8,025,455 B2* | 9/2011 | Huang et al. | 403/322.4 |
| 2003/0210952 A1* | 11/2003 | Hsiao | 403/322.4 |

FOREIGN PATENT DOCUMENTS

| | | |
|---|---|---|
| JP | 51-14061 | 2/1976 |
| JP | 60-168702 | 11/1985 |
| JP | 9-13549 | 1/1997 |
| JP | 9-151557 | 6/1997 |
| JP | 2004-116107 | 4/2004 |
| JP | 2004-134464 | 4/2004 |
| JP | 2004-204534 | 7/2004 |
| JP | 2004-270144 | 9/2004 |
| JP | 2005-66721 | 3/2005 |

* cited by examiner

CONNECTION DEVICE

BACKGROUND OF THE INVENTION

The present invention relates to a connection device, and more particularly to a connection device configured such that it can simply and strongly connect and fix a predetermined body to an attachment target using a principle of lever and easily release a connected and fixed state.

As a method of connecting a body for the purpose of connecting a particular body to a particular target, there are various methods such as a method using a bonding agent, a method using nails and screws and a method of interposing a connecting member such as a metal fitting, welding of metal to metal or to other material, blazing, and the like. However, since these connecting methods are semi-permanent and fixed connecting methods, when a connected state is released, these members are so damaged that they cannot be reused in any cases.

When components such as houses, furniture, and various types of structures are semi-permanently integrally connected, the connecting methods described above are optimum because a connection strength is especially important. However, the above connecting methods are not suitable for, for example, a display booth in an exhibition and the like, a partition of an office, and a commodity display shelf, the arrangements of which must be appropriately modified and which must be disassembled and then reassembled in other place. When, for example, a display booth, which is constructed by plywood panels such as plywood, wood braces or the like, is explained as an example, they are connected to each other using nails, screws, metal fittings, bonding agents, and the like. Accordingly, the booth can be actually used only once and many members constituting the booth are discarded after use, which is not economical.

From the above point of view, many connection devices and connection structures, which permit respective members to be connected, disconnected and disassembled have been proposed including patent documents shown below.

Patent Document 1: Japanese Patent Application Laid-Open No. 9-013549
Patent Document 2: Japanese Patent Application Laid-Open No. 9-151557
Patent Document 3: Japanese Patent Application Laid-Open No. 2004-204534
Patent Document 4: Japanese Patent Application Laid-Open No. 2004-116107
Patent Document 5: Japanese Patent Application Laid-Open No. 2004-270144

SUMMARY OF THE INVENTION

The invention disclosed in Patent Document 1 is a coupling device for connecting partition panels and has such a structure that it is interposed between side portions of two panels desired to be connected and both the panels can be simply connected tentatively by manipulating a lever. However, the invention has a bottleneck in that a connecting member is large and as high as the vertical length of the panels, a structure is complex, and further a connection is made tentatively in any case and a coupling work is additionally required.

The invention disclosed in Patent Document 2 is an invention relating to a coupling metal fitting for connecting a longitudinal cross piece of a glass panel to a lateral cross piece thereof. In the coupling metal fitting, a locking claw of the coupling metal fitting disposed in the lateral cross piece is locked into a groove of the longitudinal cross piece and the lateral cross piece is fixed to the longitudinal cross piece in this state. It is assumed that a configuration of the coupling metal fitting is relatively simple and the longitudinal cross piece and the lateral cross piece can be assembled very easily. However, a locking strength of the locking claw to the longitudinal cross piece eventually depends on an elastic force of an arm abutted against the longitudinal cross piece so as to push it. Therefore, there are assumed such circumstances that when the elastic force of the arm is increased to increase the locking force, the locking claw inserted into a cutout formed in the longitudinal cross piece comes into pressure contact with the groove and makes it difficult or impossible to move the lateral cross piece to a predetermined attachment position. When the elastic force of the arm is weakened to ease the movement on the contrary, the locking strength of the locking claw is reduced. Thus, the invention has antinomy.

The inventions disclosed in Patent Documents 3 and 4 relate to coupling of partition panels like Patent Document 1 and relate to a device for coupling the panels. It is assumed that a coupler proposed in the inventions can increase a coupling strength as a coupler for coupling predetermined panels. However, the coupler has many complex components and does not have versatility because it is dedicated for coupling of only panels.

The invention disclosed in Patent Document 5 has such a configuration that screwing portions of a bolt are previously formed in panels, and the panels are connected by the bolts. Although Patent Document 5 is most simply configured in Patent Documents described above, it is naturally inferior in workability because many bolts are screwed one by one.

In general, conventional techniques including Patent Documents described above have problems in that they lack versatility, are used for specific targets without taking versatility into consideration at all, have a complex structure, and are disadvantageous in a connecting strength.

The present invention provides a highly versatile connection device characterized in that it has a simple structure and a high connecting strength which can be adjusted when necessary and further can optionally set an attachment position to a target to be attached.

That is, the invention is a connection device fixing device (hereinafter, simply called "connection device" including the following embodiments) configured to detachably connect two members to be connected to each other (hereinafter, called "connection target member" including the following embodiments) using a principle of lever. The invention is a connection device characterized in that a connection device main body is formed of two lever members located in confrontation with each other, power application portions, fulcrum portions, and operating point portions are formed in the lever members integrally therewith, a means for locking the power application portion sides to one of two connection target members is disposed, means locked to the other connection target member are disposed in the operating point portions, both the lever members are configured to swing about the fulcrum portions, drive means are disposed in the confronting power application portions of the two lever members to cause both the power application portions to approach each other or separate from each other, and both the connection target members are caused to approach each other and fixed by causing the power application portions to approach each other or separate from each other by the drive means.

Since the invention is configured to connect two connection target members by the principle of lever, when the drive means disposed in the power application portions of two lever members are composed of screws, the operating point portions execute a swing motion to cause both the connection target members to approach each other by screwing or returning the screws. As a result, both the connection target members are located very close to each other and strongly fixed to each other.

When the drive means executes an inverse motion, the fixed state of both the connection target members can be easily released, and the connection target members are not subjected to any damage unlike a case that a connection means such as a nail or a screw is used. Therefore, the connection target members can be used repeatedly.

Since the connection device is very simply configured basically using a pair of the lever members or using a different fulcrum member constituting a fulcrum portion in addition to the lever members, it can be formed compact in its entirety and can be provided at a low price.

Further, when the drive means, which causes the pair of lever members to approach each other and separate from each other, is composed of the screw, not only is a configuration simplified but also the approaching and separating state of the confronting power application portions can be easily and delicately adjusted by the screw. As a result, the fixed state of the connection target members can be easily and delicately adjusted.

BRIEF DESCRIPTION OF THE DRAWINGS

FIGS. 8A and 8B show a third embodiment of the invention, wherein FIG. 8A is a partly broken side view of a connection device showing a state before connection target members are connected and fixed, and FIG. 8B is a partly broken side view of the connection device showing a state that the connection target members are connected and fixed.

DETAILED DESCRIPTION OF THE DRAWINGS

A connection device has a pair of lever members, a fulcrum member made by integrating fulcrum portions of the lever members for causing the fulcrum portions to act as a fulcrum, and a means for fixing a connection device main body to one of connection target members with respect to the fulcrum member. These members are formed of a metal material such as iron so that they are made less expensive while keeping a high strength.

Next, an operation principle of the connection device according to the invention will be explained with reference to FIG. 1 and subsequently specific configurations of the invention will be shown as embodiments based on the operation principle.

Figure 1:
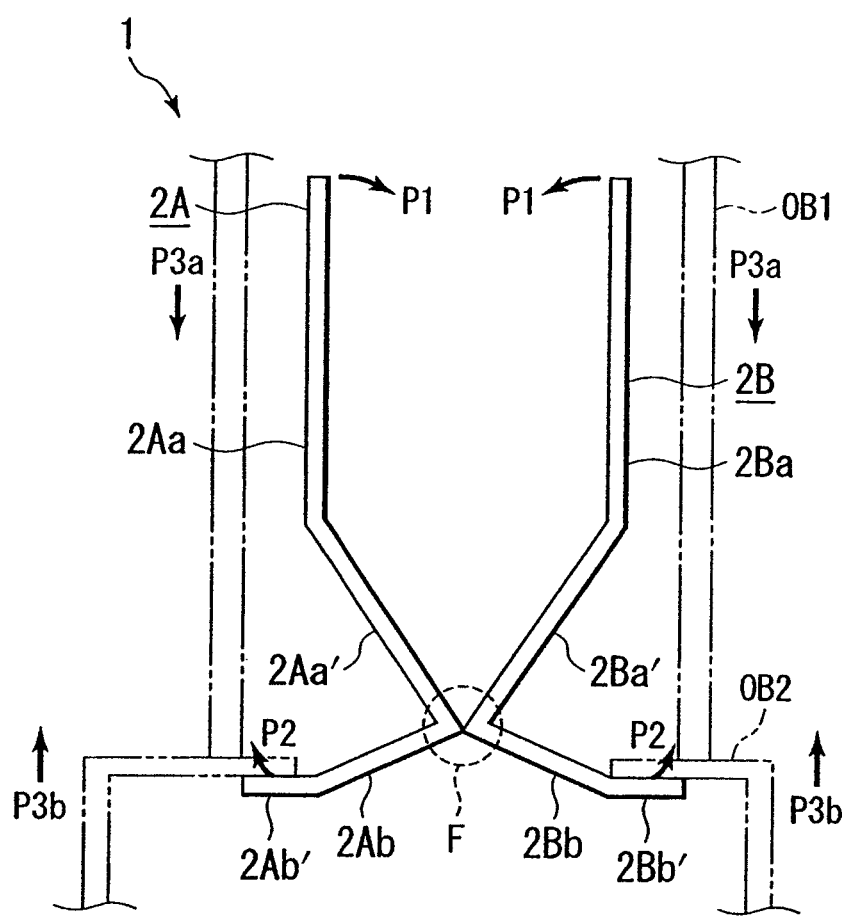
FIG. 1 is a view showing an operation principle of a configuration example of a connection device according to the invention.

In FIG. 1, a connection device 1 is composed of two lever members 2A and 2B having a symmetrical shape. Reference numerals 2Aa and 2Ba denote power application portions constituting power points of the lever members 2A, 2B, the lower portions of the lever members 2A, 2B constitute slope portions 2Aa', 2Ba' by being bent so as to approach each other, and the both power application portions 2Aa, 2Ba are abutted with each other and the abutted portion constitutes a fulcrum portion F. Although FIG. 1 does not show a specific configuration of the invention because it shows only a concept of the invention, an appropriate means may be employed as the fulcrum portion F. That is, the fulcrum portion F may be configured as, for example, a hinge structure or a different member may be used as shown in an embodiment described later.

The lever members 2A, 2B are reversely bent externally again, respectively using the fulcrum F as a start point so that they are separated from each other and constitute operating point portions 2Ab, 2Bb. Further, the extreme ends of the operating point portions 2Ab, 2Bb are configured as locking portions 2Ab', 2Bb' which directly operate as the operating point portions by being locked to an opponent connection target member.

In the above configuration, the power application portions 2A, 2B and the fulcrum portion F of the connection device 1 are connected to one of connection target members, i.e., a connection target member OB1 by a means shown in the embodiments described later, and the locking portions 2Ab', 2Bb' of the operating point portions 2Ab, 2Bb are locked to the other connection target member OB2.

In this state, the power application portions of both the lever members 2A, 2B are operated by a drive means (shown by specific examples of the embodiments) so as to approach each other. The approach operation acts on the power application portions as a rotating motion P1 around the fulcrum portion F and a force P1 resulting from the rotating motion is converted to a force P2 which is generated by an operation for moving the locking portions 2Ab, 2Bb upward at the fulcrum F. As a result, the connection target member OB2 acts as a force P3b for causing the connection target member OB2 to approach the connection target member OB1 to which the connection device 1 is fixed. When the force P3b is viewed from the connection target member OB1 side, it acts as a force P3a which causes the connection target member OB1 to approach the connection target member OB2. The confronting forces P3a, P3b act as forces for causing both the connection target members OB1, OB2 to come into pressure contact with each other. As a result, the connection target members OB1, OB2 are fixed to each other by the pressure contact force.

The confronting forces P3a, P3b are adjusted by appropriately adjusting a degree of approach of the power application portions 2Aa, 2Ba of the lever members 2A, 2B by adjusting the drive means so that both the connection target members OB1, OB2 can be connected and fixed to each other by a desired connection strength. Further, when both the power application portions 2Aa, 2Ba are separated from each other more than a predetermined distance by the drive means, the pressure contact state of the locking portions 2Ab', 2Bb' to the connection target member OB2 is released. As a result, the forces P1a, P3b are eliminated and the connected state of both the connection target members OB1, OB2 is released.

Further, it is also possible to configure the connection device such that when the lever members 2A, 2B extend to an opponent lever member side through the fulcrum F unlike the above configuration, i.e., when both the lever members 2A, 2B are caused to intersect with each other through the fulcrum F, the force P2 is generated to the locking portions 2Ab' 2Bb' by executing an operation for separating the power application portions 2Aa, 2Ba from each other, and when the power application portions 2Aa, 2Ba are caused to approach each other inversely, the force P2 is eliminated. The configuration will be also specifically explained using the embodiments.

Embodiment 1

Figure 2:
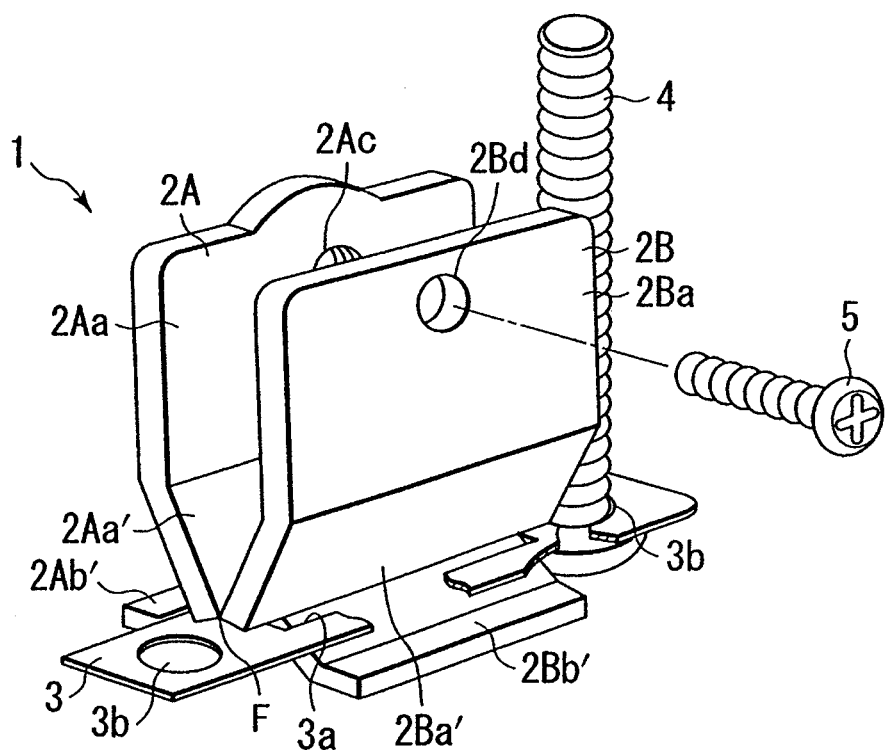
FIG. 2 is a perspective view of a connection device showing a first embodiment of the invention.

FIG. 2 shows a first embodiment of the invention. Note that the same portions as those shown in FIG. 1 are denoted by the same reference numerals.

Lever members 2A, 2B constituting an illustrated connection device 1 are composed of a metal such as steel or aluminum, or may be composed of a material other than the metal such as plastic as long as it has the same strength as the metal.

As shown also in FIG. 1, the lever members 2A, 2B reach bent portions, which constitute a fulcrum portion F, through confronting power application portions 2Aa, 2Ba and slope portions 2Aa', 2Ba' where both the power application portions 2Aa, 2Ba are located close to each other. Reference numeral 3 denotes a member for constituting the fulcrum F (hereinafter, called "fulcrum member"). As shown in FIG. 2, the fulcrum member 3 is a plate member in which a long hole 3a is formed at a center in a longitudinal direction so that the bent portions, where the lever members 2A, 2B are abutted with each other, are located in the long hole 3a. That is, the two lever members 2A, 2B are integrated by the fulcrum member 3 and configured as the one connection device 1.

The lever members 2A, 2B of the connection device 1 integrated by the fulcrum member 3 constitute a fulcrum F by the fulcrum member 3 while the lever members 2A, 2B can swing using an inserting portion of the long hole 3a as the fulcrum. Reference numerals 3b denote screw insertion holes formed in both the ends of the fulcrum member 3, attachment screws 4 are inserted through the screw insertion holes 3b and screwed into a connection target member OB1 (refer to FIG. 1) to thereby fix the connection device 1 to the connection target member OB1. That is, the fulcrum member 3 also has a function of fixing the connection device 1 to a predetermined target in addition to the function of constituting the fulcrum F of the connection device 1.

Next, a screw hole is formed in one of both the lever members 2A, 2B. In the illustrated configuration, the screw hole 2Ac is formed in the lever member 2A. Further, a screw insertion hole 2Bd, into which a screw 5 that is screwed into the screw hole 2Ac is inserted, is formed in the lever member 2B at a position confronting the screw hole 2Ac. With this configuration, when the screw 5, which is to be inserted into the screw insertion hole 2Bd and screwed into the screw hole 2Ac, is rotated in a screwing direction, the power application portions 2Aa, 2Ba of both the lever members 2A, 2B approach each other. With this operation, locking members 2Ab' 2Bb' of the lever members 2A, 2B generate a force P2 which rotates upward through the fulcrum F composed of the fulcrum member 3 (refer to FIG. 1). As a result, a connection target member OB2, to which the locking members 2Ab' 2Bb' are locked, is strongly connected and fixed to the connection target member OB1 to which the connection device 1 is fixed. More specifically, in the illustrated configuration, the screw 5 and the screw hole 2Ac into which the screw 5 is screwed are configured as a drive means for causing the lever members 2A, 2B to approach each other and separate from each other.

Note that since the approaching and separating operations of both the lever members 2A, 2B are swing operations which draw arcs about the fulcrum F, the screw 5 that is screwed into the lever member 2A is also displaced by the swing operations. Accordingly, the screw insertion hole 2Bd has an inside diameter formed larger than the outside diameter of the screw 5 to allow the screw 5 to be displaced.

Figure 3A:
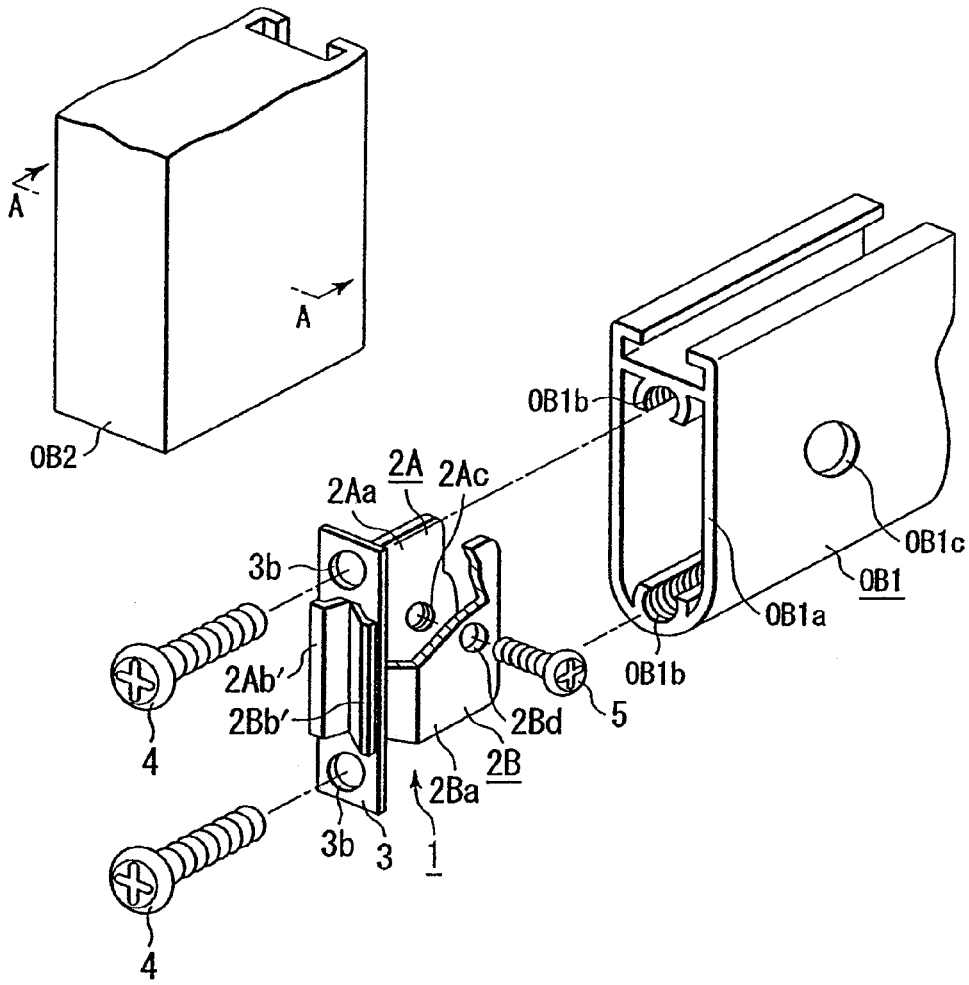
FIG. 3A is a perspective view showing a disposition relation between two connection target members and the connection device using the connection device shown in FIG. 1.
Figure 3B:
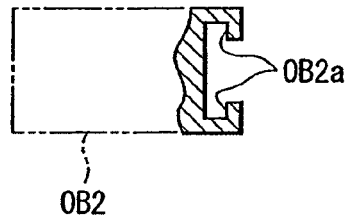
FIG. 3B is a sectional view taken along the line A-A of FIG. 3A.
Figure 3C:
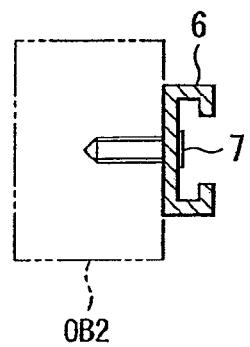
FIG. 3C is a sectional view showing a modification of a configuration shown in FIG. 3B.

FIG. 3 specifically shows a state that the connection target members OB1 and OB2 are connected and fixed to each other using the connection device 1.

When both the connection target members OB1 and OB2 are connected and fixed to each other, a connecting and fixing work is executed in a sequence of attaching the connection device 1 to the connection target member OB1 first, and subsequently connecting and fixing the connection target member OB2 to the connection target member OB1 through the connection device 1 fixed to the connection target member OB1.

First, a state that the connection device 1 is attached to the connection target member OB1 will be explained.

The connection device 1 is inserted into the connection target member OB1 in a state that the screw 5 is removed therefrom sequentially from the extreme ends of the power application portions 2Aa, 2Ba of the lever members 2A, 2B until the fulcrum member 3 of the connection device 1 is abutted against a lower edge OB1a of the connection target member OB1. Two screw holes OB1b, OB1b are opened to the lower edge OB1a of the connection target member OB1 while the two screw insertion holes 3b, 3b of the fulcrum member 3 are opened at positions corresponding to the screw holes OB1b, OB1b. When the screws 4, 4 are screwed into the screw holes OB1b, OB1b through the screw insertion holes 3b, 3b of the fulcrum member 3, the connection device 1 is fixed to the connection target member OB1 in its entirety through the fulcrum member 3.

Further, an opening OB1c is formed in the connection target member OB1 at a position corresponding to the screw hole 2Ac and the screw insertion hole 2Bd of the connection device 1 when the connection device 1 is fixed to the connection target member OB1. When the connection device 1 is fixed to the connection target member OB1, a state that the connection target member OB2 can be attached can be obtained by screwing the screw 5 to the screw hole 2Ac of the lever member 2A through the opening OB1c and the screw insertion hole 2Bd of the lever member 2B on the connection device 1 side.

In contrast, a to-be-locked portion OB2a, to which the locking portions 2Ab' 2Bb' of the connection device 1 are locked, is formed in the connection target member OB2 (refer to FIG. 3B). Further, the screw 5 is previously loosened on the connection device 1 side so that the locking portions 2Ab' 2Bb' can be inserted into the to-be-locked portion OB2a. In this state, the locking portions 2Ab' 2Bb' are located in the to-be-locked portion OB2a of the connection target member OB2, and the connection target member OB2 is engaged with the connection device 1.

In this engaged state, the connection target member OB2 is swung to a predetermined position with respect to the connection target member OB1, and when the connection target member OB2 has been positioned, the screw 5 is caused to gradually approach the power application portions 2Aa, 2Ba of the lever members 2A, 2B through the opening OB1c of the connection target member OB1. The force P2 shown in FIG. 1 is generated to the engaging portions 2Ab' 2Bb' of the connection device 1 by the approach operation, the engaging portions 2Ab' 2Bb' are strongly in contact with the to-be-locked portion OB2a of the connection target member OB2, and both the connection target members OB1 and OB2 are strongly connected and fixed to each other by the forces P1a and P3b shown in FIG. 1. Further, when an operation opposite to the operation described above is executed, both the connection target members OB1 and OB2 are easily released from the connected and fixed state without being subjected to any damage and can be returned to respective members.

Further, as a matter of course, when one of the connection target members is configured such that the connection device 1 can be attached thereto and the screw 5 can be manipulated, and the other connection target member has an engaging portion formed thereto with which the locking portions 2Ab' 2Bb' of the connection device 1 are engaged, the shapes of the respective connection target members are not limited to the illustrated sash-shape, and any arbitrary shape can be selected according to a way of use.

Further, as shown in FIG. 30, even if the to-be-locked portion OB2a is not formed in the connection target member OB2, when a to-be-locked member 6 having a to-be-locked portion is attached to the connection target member OB2 by a fixing means such as a screw 7, the connection target member OB2 can be attached to the connection target member OB1 through the to-be-locked member 6. Further, when a member, which can manipulate the screw 5 and fix the connection device 1, is configured independently of the connection target member OB1 so that this member can be attached to the connection target member OB1, both the connection target members OB1 and OB2 can be connected to each other without providing the connection target member OB1 itself with special processing for attaching and operating the connection device 1 like the connection target member OB2.

Figure 4:
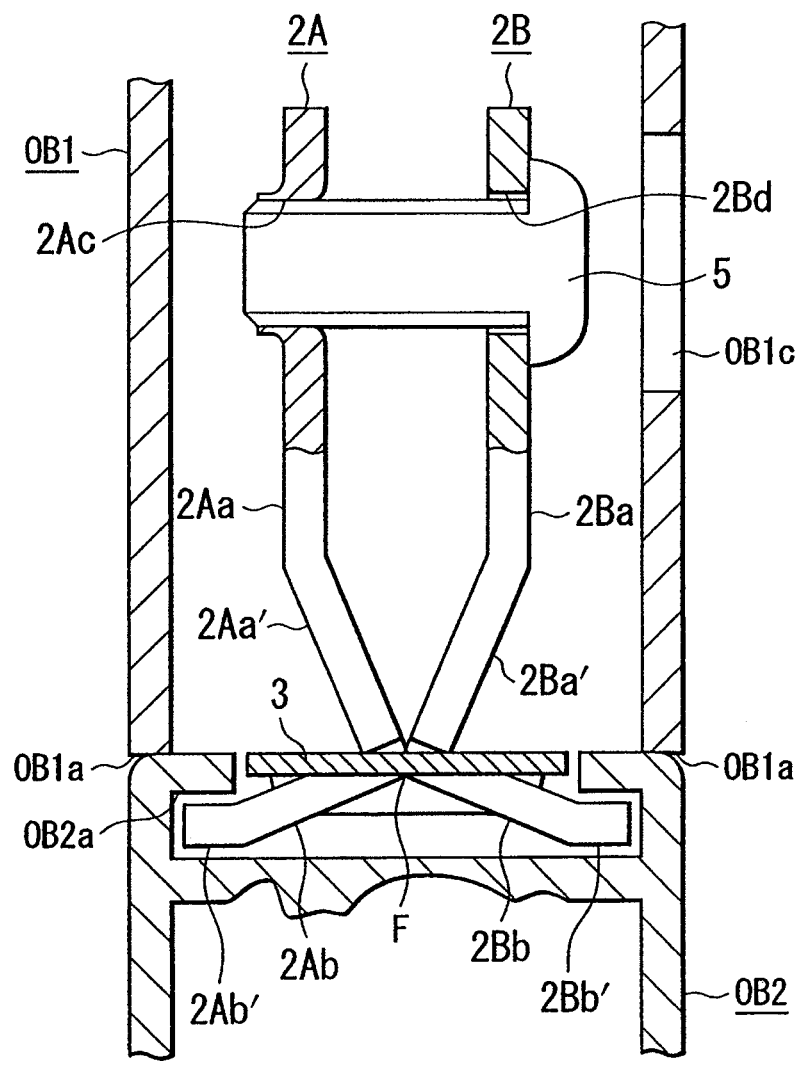
FIG. 4 is a sectional view showing a state that the two connection target members are connected using the connection device shown in FIG. 2 before a state that both the connection target members are connected and fixed.
Figure 5:
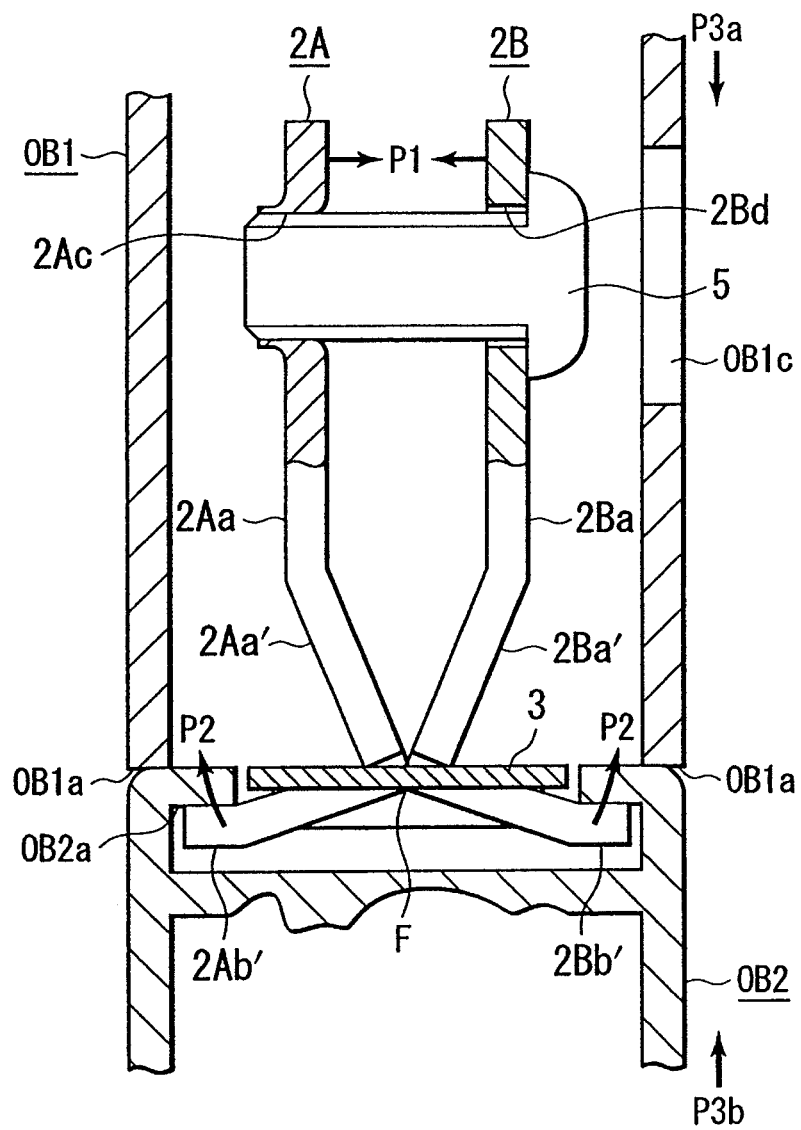
FIG. 5 is a sectional view showing a state that the two connection target members are connected using the connection device shown in FIG. 2 and is a view showing a state both the connection target members are connected and fixed.

FIGS. 4 and 5 specifically show a connected state of both the connection target members OB1 and OB2 in the configuration shown in FIG. 3, wherein FIG. 4 shows a state that the connection target member OB1 is not fixed to the connection target member OB2 and the positions thereof can be mutually changed, and FIG. 5 shows a state that the connection target member OB1 is strongly fixed to the connection target member OB2 at a predetermined position.

First, in FIG. 4, the screw 5 is loosened and thus the power application portions 2Aa, 2Ba of the lever members 2A, 2B of the connection device 1 are separated from each other. As a result, the locking portions 2Ab', 2Bb' of the operating point portions 2Ab, 2Bb do not come into pressure contact with the to-be-locked portion OB2a of the connection target member OB2, and the connection target members OB1 and OB2 can relatively move in a longitudinal direction of the connection target member OB2 (in the illustrated case, in a depth direction of the connection target member OB2).

When the relative positions of the connection target members OB1 and OB2 are determined, the screw 5 is tightened by a driver through the opening OB1c of the connection target member OB1, and the power application portions 2Aa, 2Ba of the lever members 2A, 2B are caused to approach each other as shown in FIG. 5. With this operation, the locking portions 2Ab', 2Bb' are caused to strongly come into pressure contact with the to-be-locked portion OB2a of the connection target member OB2 by generating the force P2 to the locking portions 2Ab', 2Bb' through the fulcrum F to thereby generate forces P3a, P3b to both the connection target members OB1 and OB so that both of them are strongly connected and fixed to each other.

Embodiment 2

Figure 6:
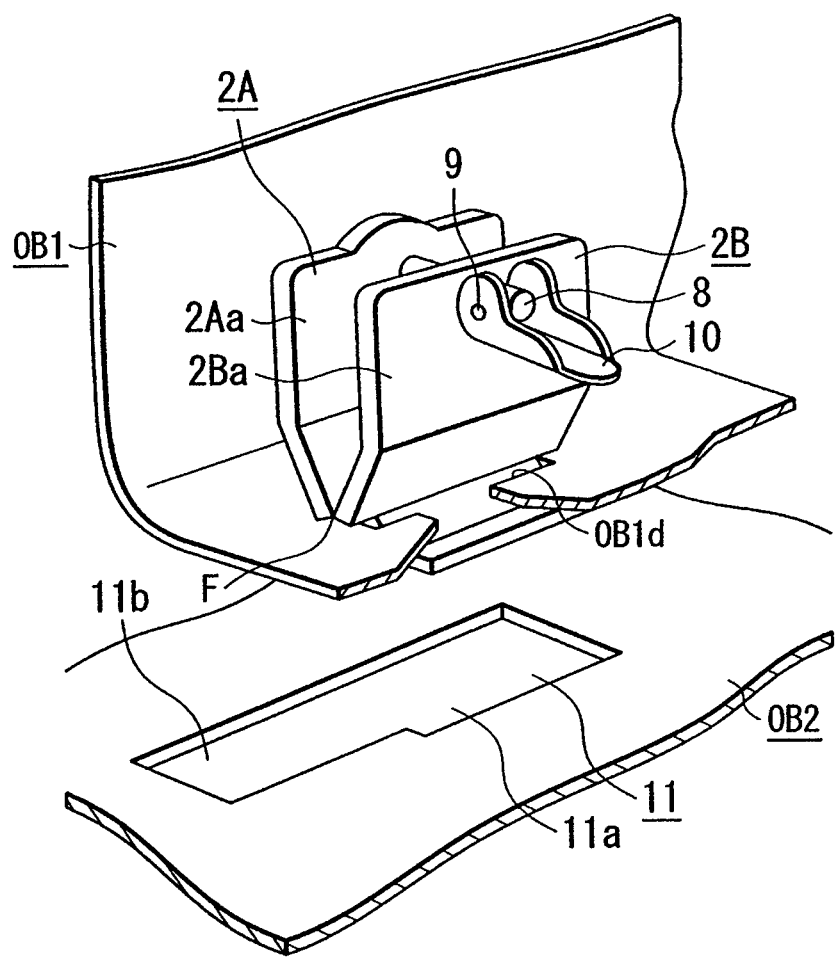
FIG. 6 is a perspective view of a connection device showing a second embodiment of the invention.
Figure 7A:
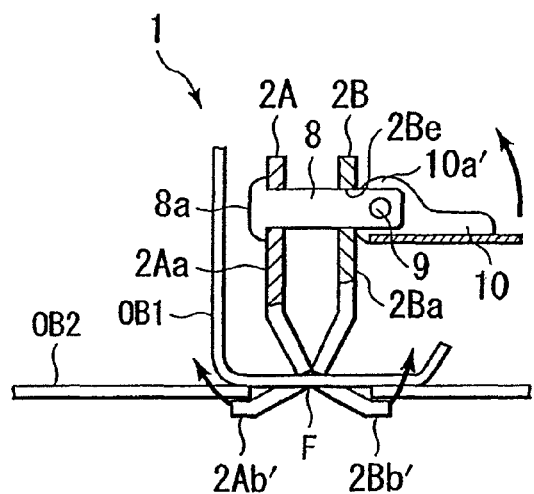
FIG. 7A is a partial sectional view of the connection device shown in FIG. 6 in a state before two connection target members are connected and fixed using the connection device.
Figure 7B:
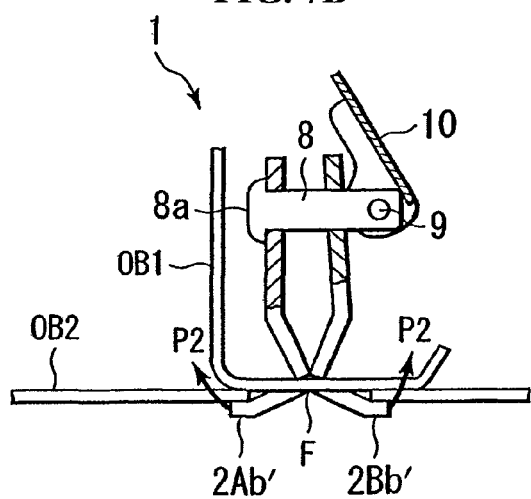
FIG. 7B is a partial sectional view of the connection device showing a connected and fixed state.
Figure 7C:
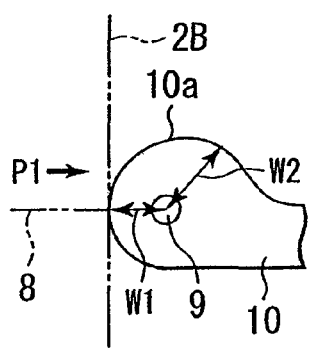
FIG. 7C is a partial view of a lever showing a configuration of a cam portion of the lever.

FIGS. 6 to 7C show a second embodiment.

The embodiment has a main feature in that a drive means, which causes lever members 2A and 2B to approach each other and separate from each other, is configured differently from the configuration of the above embodiment.

Reference numeral 8 denotes a pin (hereinafter, called "drive pin") disposed in the lever members 2A and 2B to drive them, and one end of the drive pin 8 is configured as a pin head 8a locked to the lever member 2A side. In contrast, a pin insertion hole 2Be having the same configuration as that of the screw insertion hole 2Bd is formed in the lever member 2B. A shaft 9, which is inserted into the pin 8 orthogonal thereto, is disposed in the portion of the pin 8 projecting to the outside of the lever member 2B from the pin insertion hole 2Be, and a lever 10 is attached to the shaft 9 so that the lever 10 can rotate about the shaft 9.

A cam portion 10a is formed in a portion of the lever 10 in contact with the lever member 2B. The shaft 9 is inserted into the cam portion 10a eccentrically to the cam portion 10a. Specifically, a distance W2 from the axial center of the shaft 9 to the lever member 2B when the lever 10 is in a raised state (state of FIG. 7B) is set larger than a distance W1 from the axial center of the shaft 9 to the lever member 2B when the lever 10 is in a horizontal state (state of FIG. 7A) (refer to FIG. 7C).

In the lever members 2A, 23 constituting a connection device 1 in the embodiment, bent portions, which constitute a fulcrum portion F, of the lever members 2A, 2B are inserted into a long hole OB1d formed in a connection target member OB1. However, it is also possible to integrally configure the connection device 1 previously using the fulcrum member 3 in the embodiment 1 and to fix a fulcrum member 3 to the connection target member OB1 to thereby indirectly attach the connection device 1 through the fulcrum member 3 in addition to the configuration for directly inserting the lever members 2A, 2B into the connection target member OB1.

Next, an example of use of the connection device 1 of the embodiment will be explained.

In FIG. 6, an opening 11 is formed in a connection target member OB2 as one of connect target members. The opening 11A has formed therein a wide portion 11a, which has a width through which locking portions 2Ab', 2Bb' of the connection device 1 extending right and left can pass as they are, and a narrow portion 11b which is continuous to the wide portion 11a and has a width narrower than the width of the extending locking portions 2Ab', 2Bb' of the connection device 1.

When both the connection target members OB1 and OB2 are connected to each other, the extending locking portions 2Ab', 2Bb' of the connection device 1 are first disposed in the back side of the connection target member OB2 through the wide portion 11a of the opening 11 by falling the lever 10 in a horizontal direction, and the entire connection device 1 is moved to the narrow portion 11b side in this state. With this operation, when the locking portions 2Ab', 2Bb' of the connection device 1 reach the narrow portion 11b, they extend to the back side of the connection target member OB2 as shown in FIG. 7A.

When the lever 10 is raised at the position of FIG. 7A as shown in FIG. 7B, the distance from the shaft 9 of the can portion 10a of the lever 10 to the contact portion of the lever member 25 changes from W1 to W2. Since W1<W2 in the cam portion 10a, both the connection target members OB1 and OB2 approach each other through the pin 8 by a distance corresponding to a length W2−W1. With this operation, a force P2 is generated to the locking portions 2Ab', 2Bb' locked to the connection target member OB2 so that both the connection target members OB1 and OB2 are connected and fixed to each other. Further, when the lever 10 is returned to the position of FIG. 7A inversely, both the connection target members OB1 and OB2 are released from the connected and fixed state. That is, in the embodiment, the connection target members can be connected and disconnected by one touch by manipulating only the lever 10.

Although connection and disconnection can be executed by one touch in the embodiment, the approaching and separating distance of the lever members 2A, 2B is fixed to W2−W1. Accordingly, when both the lever members 2A, 2B are formed of a material which is hardly elastically deformed, there is a possibility that the connection target members OB1, OB2 or the pin 8, the shaft 9, and the lever 10 which are a drive means of the lever members are damaged because a fixing strength is too large. On the contrary, there arises a case that a connected state is too loose due to a difference in the shape such as a thickness of the locking portions of the connection target members. In view of the above points, it is preferable to generate an appropriate pressure contact force P2 by composing at least one of the lever members 2A, 2B of an elastically deformable material so that the connection target members are elastically deformed even if the approaching and separating distance of both the lever members 2A, 2B is fixed.

Further, a spring may be interposed between the lever members 2A and 2B so that a separating operation of both the lever members 2A, 2B can be smoothly executed by an elastic force of the spring when the lever 10 is fallen in the horizontal direction.

Embodiment 3

Figure 8A:
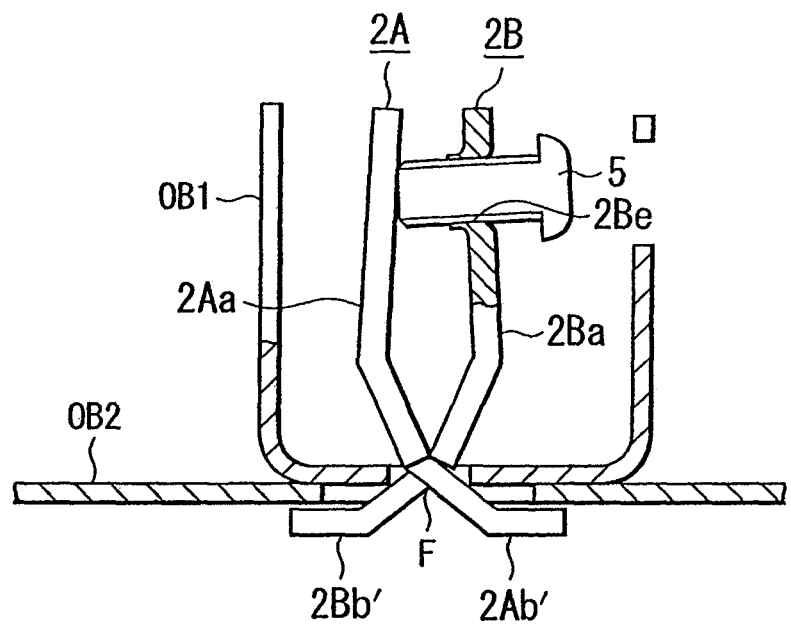
Figure 8B:
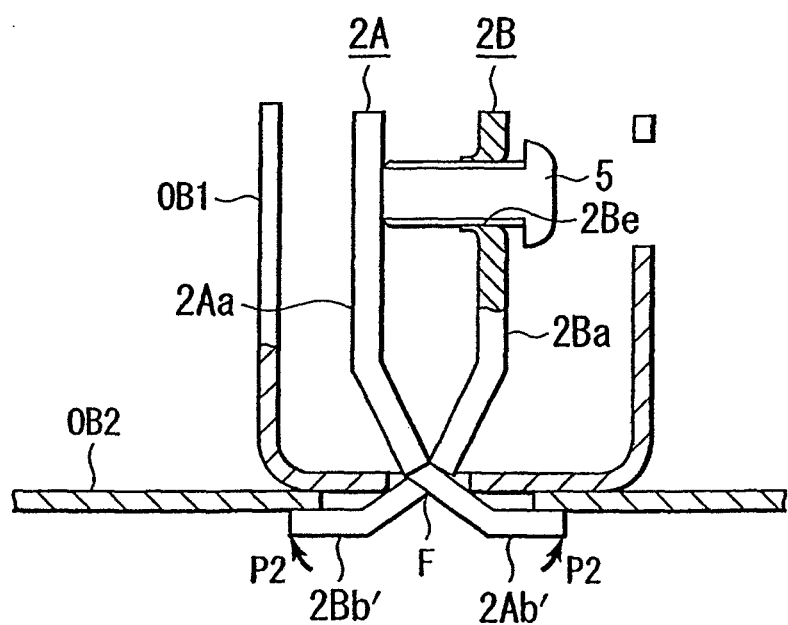

FIGS. 8A and 8B show a third embodiment of the invention.

In the embodiment, a combination of the lever members 2A, 2B and a configuration of a drive means of both the lever members 2A, 2B are mainly different from those of the embodiments described above.

First, both the lever members 2A, 2B intersect with each other in a fulcrum portion F by a hinge structure or the like, and a locking portion 2Ab' of the lever member 2A is located below the lever member 2B and a locking portion 2Bb' of the lever member 2B is located below the lever member 2A. Therefore, a force P2 is generated in the locking portions 2Ab', 2Bb' by separating power application portions 2Aa, 2Ba of both the lever members from each other (state of FIG. 8B) and is eliminated by causing both the power application portions 2Aa, 2Ba to approach each other on the contrary (state of FIG. 8A).

Note that although the drive means of the embodiments 1 and 2 can be used as it is as a drive means for executing the approaching/separating operation of the lever members 2A, 2B, the embodiment 3 shows a third drive means.

A screw hole 2Be, to which a screw 5 is screwed, is formed in one of the lever members 2A and 2B (the lever member 2B in an illustrated configuration), and the extreme end of the screw 5 is abutted against the inner surface of the lever member 2A confronting the lever member 2B. As a result, the power application portions 2Aa, 2Ba of the lever members 2A and 2B are separated from each other by screwing the screw 5, a force P2 is generated in 2Ab', 2Bb' as shown in FIG. 8B, and both the connection target members OB1 and OB2 are connected and fixed to each other. On the contrary, a state of FIG. 8A is obtained by returning the screw 5 so that the connected state of both the connection target members OB1, OB2 is released.

Since displacement of the screw 5 caused by the approaching/separating operation of both the lever members 2A, 2B is absorbed by displacement of the contact position of the extreme end of the screw 5 because the extreme end of the screw 5 screwed to the lever member 2B is only abutted against the lever member 2A, it is not necessary to pay a special design consideration to the displacement of the screw 5.

Since a special drive source is not necessary for the approaching/separating operation of the lever members 2A, 2B, the force P2 is simply eliminated. Since the force P2 is not applied, both the connection target members OB1, OB2 can be naturally separated from each other. However, when a drive means such as a tension spring is interposed between the lever members 2A and 2B, the power application portions 2Aa, 2Ba of the lever members 2A and 2B can securely execute the approaching operation according to the screw 5 being returned.

The fulcrum portion F is disposed and fixed to the connection target member OB1 side by passing through an opening formed in the connection target member OB1 side also in the present embodiment like the embodiment 2. However, it is naturally possible to fix the connection device 1 to the connection target member OB1 using the fulcrum member 3.

The invention can be realized regardless of a size of the connection device as long as one of connection target members has a means for fixing the connection device and the other connection target member has a to-be-locked portion to which the locking portion of the connection device is locked. Accordingly, a small connection device can be used in home or as an angle of a commodity display shelf, and a large connection device can be used as a material for constituting an angle of a construction.

When, for example, the connection device is used as a material for assembling a scaffold used when a building is constructed or torn down, the scaffold can be reassembled in a next site by disassembling angles when a building or tearing down work is finished. Further, when a rail-like member having to-be-locked portions is disposed on a ceiling and other members are appropriately attached to the member using the connection devices at predetermined positions in a lengthwise direction of the member, a layout of, for example, light fittings can be easily and appropriately changed in a sale and the like of the light fittings. Accordingly, the connection device has various ways of use.

The invention claimed is:

1. A connection device in combination with two adjacently disposed connection target members for detachably connecting and fixing the two adjacently disposed connection target members together, comprising a connection device main body comprised of a pair of lever members configured swingably about a fulcrum, each one lever member consisting of, consecutively, a flat upright power application portion extending along a first straight line from a first end of said one lever member, a flat sloped portion continuous with the power application portion and extending along a second straight line, directly and angularly from an end of the power application portion, whereby the respective sloped portions extend toward each other, a flat operating portion continuous from the flat sloped portion and extending along a third straight line, directly and angularly from an end of the flat sloped portion, wherein a junction of the flat sloped portion and the flat operating portion is a fulcrum point at which the lever members are in contact with each other, and a flat, locking portion continuous from an end of the operating portion, and extending along a fourth straight line, directly and angularly from said end of the operating portion to a second end of the lever member, drive means entirely at the power application portions for causing the power application portions to execute motion in which the power application portions approach each other and separate from each other over a fixed distance, the operating portions extending through respective mutually aligned openings in the connection target members, the locking portions substantially flatly abutting against a portion of an outermost peripheral surface of a first of the connection target members so as to releasably lock a portion of an opposing outermost peripheral surface of the first connection target member to a second of the connection target members disposed adjacently to the first connection target member, the distance between the outermost peripheral surface and the opposing outermost peripheral surface of the first connection target member being an entire width of the first connection target member, whereby portions of the two connection target members defining horizontal surfaces are horizontally disposed directly adjacent each other and are locked together when the power application portions approach each other and unlocked from each other when the power application portions separate from each other upon operation of the drive means and whereupon as the power application portions approach each other the locking portions are substantially flatly abutted against the outermost peripheral surface of the first connection target member so as to lock the adjacently disposed connection target members together, the drive means driving the power application portions about the fulcrum of the connection device, formed by the fulcrum points in contact with each other, for moving the locking portions upwardly against the outermost peripheral surface of the first connection member so as to cause an application of force from the locking portions that is directed in the same direction and toward each of the connection target members upon locking of the connection target members together and a release of the application of force upon unlocking of the connection target members.

2. The connection device according to claim 1, wherein each of the operating portions is angled inversely relative to the slope portion so that the operating portions diverge from each other, a bent portion thereby formed between the slope portion and the operating portion forming the fulcrum point of each of the lever members.

3. The connection device according to claim 2, further comprising a plate member in which an elongated hole is formed, the bent portions of the lever members being disposed in the elongated hole, and wherein a means for fixing the connection device main body to one of the connection target members comprises fixing means for fixing the plate member to said one of the connection target members.

4. The connection device according to claim 1, wherein the drive means comprises:
a screw hole formed in the power application portion of one of the lever members,
a screw and
a screw insertion hole, through which the screw is inserted, is formed in the power application portion of the other lever member at a position opposing the screw hole, the screw being screwed into the screw hole through the screw insertion hole.

5. The connection device according to claim 1, wherein the drive means comprises:
a drive pin passing through the power application portion of each of the lever members, the drive pin at a distal end portion thereof being fixed to the power application portion of one of the lever members and having a proximal end portion projecting from the power application portion of the other lever member,
a lever which is rotatable about a shaft connected to the proximal end portion of the drive pin and an axis of rotation of the lever being orthogonal to a longitudinal axis of the drive pin, and
a cam is formed on a distal end of the lever, the cam abutting against an outside surface of the power application portion of said other lever member for causing the power application portions to approach and separate from each other, the cam comprising a first distance and a second distance, respectively, a distance difference between said second distance and said first distance defining the fixed distance throughout which the power application portions approach and separate from each other.

6. The connection device according to claim 5, wherein at least one of the lever members comprises an elastically deformable material.

7. The connection device according to claim 1, wherein the drive means comprises a screw hole formed in the power application portion of one of the lever members and a screw screwed into the screw hole and having a distal end abutting against the power application portion of the other lever member.

* * * * *